United States Patent [19]

Sarada et al.

[11] Patent Number: 5,569,317
[45] Date of Patent: Oct. 29, 1996

[54] FLUORESCENT AND PHOSPHORESCENT TAGGED INK FOR INDICIA

[75] Inventors: Thyagaraj Sarada; Richard A. Bernard, both of Norwalk, Conn.

[73] Assignee: Pitney Bowes Inc., Stamford, Conn.

[21] Appl. No.: 362,372

[22] Filed: Dec. 22, 1994

[51] Int. Cl.$^6$ .................................................. C09D 11/02
[52] U.S. Cl. .................. 106/21 A; 106/20 B; 106/22 B; 106/23 B
[58] Field of Search ............................ 106/21 R, 21 A, 106/20 B, 23 B, 22 B

[56] References Cited

U.S. PATENT DOCUMENTS

| | | | |
|---|---|---|---|
| 3,560,238 | 2/1971 | Rothery | 106/21 A |
| 3,671,451 | 6/1972 | Butterfield | 106/21 A |
| 3,867,302 | 2/1975 | Takano et al. | 106/21 A |
| 3,892,972 | 7/1975 | Cevasco | 106/21 A |
| 3,960,755 | 6/1976 | Beachem et al. | 106/21 A |
| 4,015,131 | 3/1977 | McDonough et al. | 106/21 A |
| 4,022,709 | 5/1977 | Ferro et al. | 106/21 A |
| 5,114,478 | 5/1992 | Auslander et al. | 106/21 A |
| 5,256,192 | 10/1993 | Liu et al. | 106/21 A |
| 5,290,348 | 3/1994 | Auslander | 106/21 R |

*Primary Examiner*—Helene Klemanski
*Attorney, Agent, or Firm*—Ronald Reichman; Melvin J. Scolnick

[57] ABSTRACT

Inks have been discovered that may be used for providing additional security to the printed matter to which the ink has been affixed. A single ink provides the foregoing result by being fluorescent and phosphorescent.

20 Claims, 2 Drawing Sheets

5,569,317

FLUORESCENT AND PHOSPHORESCENT TAGGED INK FOR INDICIA

CROSS REFERENCE TO RELATED APPLICATIONS

Reference is made to commonly assigned copending patent application Docket No. E-316 filed herewith entitled "Luminescent Facing Marks For Enhanced Bar Code Discrimination" in the names of Richard A. Connell, Thyagaraj Sarada and Richard A. Bernard.

FIELD OF THE INVENTION

The invention relates generally to the field of inks, and more particularly to luminescent inks.

BACKGROUND OF THE INVENTION

One of the by-products of the business climate being driven by technological advances is the need of greater security i.e., commercially available desk top printers and color photocopiers have been used to forge documents. Thus, additional security is needed for documents that are issued by governments, financial institutions, brokerage houses, postal meter printing and the like i.e., indicia printing and lottery tickets. One scheme that has been proposed for providing security is to print authenticating text in invisible ink so that the same does not interfere with the document upon which such text is printed, but one, nevertheless, is able to determine the authenticity of the document and the holder of the document as well. A luminescent ink may also be used for similar security purposes.

Typically luminescence will become visible to the naked eye when stimulated or excited by suitable radiation. Fluorescent inks and phosphorescent inks are types of luminescent inks. The emission of light from a fluorescent ink is caused by the absorption of energy (light or electromagnetic radiation) into the inks molecule that causes an excited state to emit or be fluorescent and ceases abruptly when the energy source is removed. The emission of light from a phosphorescent ink will persist after a time interval in which the energy source has been removed.

The United States Postal Service is currently selling stamps that have been printed with a phosphorescent ink and accepting postal indicia that have been printed by a postage meter that uses fluorescent inks. Current fluorescent inks that are used in postage meters approved by the United States Postal Service contain a fluorescent ink that is excited by a 254 nm ultra violet light source that emits a fluorescent light in the orange to red region of the visible spectrum between 580 to 650 nm. Mail sorting equipment like the Advance Facer Cancelling System manufactured by Electricom AEG are being used to cancel stamps that have been affixed to mail pieces and check whether or not the postal indicia affixed to mail pieces were affixed by an authorized meter. Luminescent inks are currently used only to assist Facer Cancelling Systems to face the mail pieces. Luminescent inks may also be used as a deterrent to counterfeiting. Some new technologies like photocopying do not use luminescent toners/inks.

SUMMARY OF THE INVENTION

The present invention overcomes the disadvantages of the prior art by providing an ink that makes it even more difficult to print fraudulent indicia and alphanumeric characters. The ink may also be used to print indicia that contains various markings that may be used for sorting and handling various materials i.e., mail pieces. A single ink provides the foregoing result by being both fluorescent and phosphorescent. Current desk top printers and color photocopiers are not capable of duplicating fluorescence and phosphorescence at the same time. The reason for the above is that while fluorescent inks would add to the brightness of the printing, phosphorescence would not add any enhancement to the print quality. Hence, phosphorescent materials are currently only used in specialty inks.

The inks of this invention may be used in current postage meters as well as being detected by current Advance Facer Canceller Systems.

DESCRIPTION OF THE PREFERRED EMBODIMENT

Figure 1:
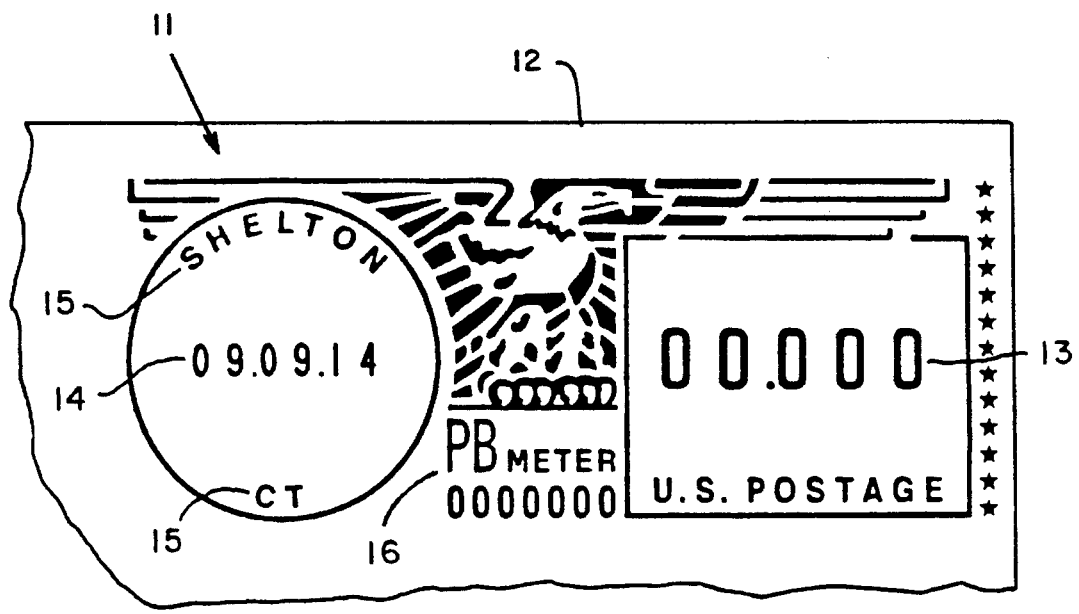
FIG. 1 is a drawing of an indicia containing normal security features (meter number) printed by conventional printing or bit map generated printing.

Referring now to the drawings in detail, and more particularly to FIG. 1, the reference character 11 represents a postal indicia on mail piece 12 that contains normal security features (meter number) printed by conventional printing or bit map generated printing. The postal indicia 11 contains a dollar amount 13, the date 14 that the postal indicia was affixed to the mail piece, the place the mail piece was mailed from 15 and the postal meter serial number 16 (for authentication) and value of postage 12.

Figure 2:
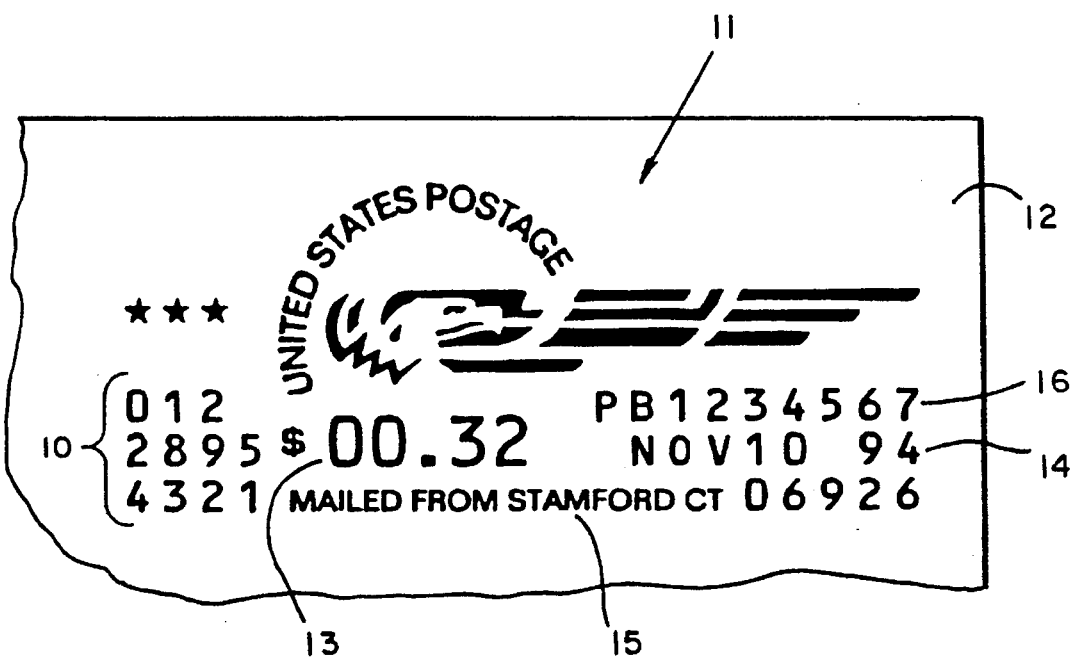
FIG. 2 is a drawing of a bit map generated postal indicia that was printed with an ink that is fluorescent with or without phosphorescence that has additional control information i.e., encrypted data.

FIG. 2 is a drawing of postal indicia 11 that was printed with an ink that is fluorescent with or without phosphorescence that has additional control information i.e., encrypted data. The postal indicia 11 may be printed on mail piece 12 by an ink jet printer or by a thermal printer, or by a laser printer or by any digital printer. The postal indicia 11 contains a dollar amount 13, the date 14 that the postal indicia was affixed to the mail piece, the place the mail piece was mailed from 15 and the postal meter serial number 16 and additionally a security code 10.

Figure 3:
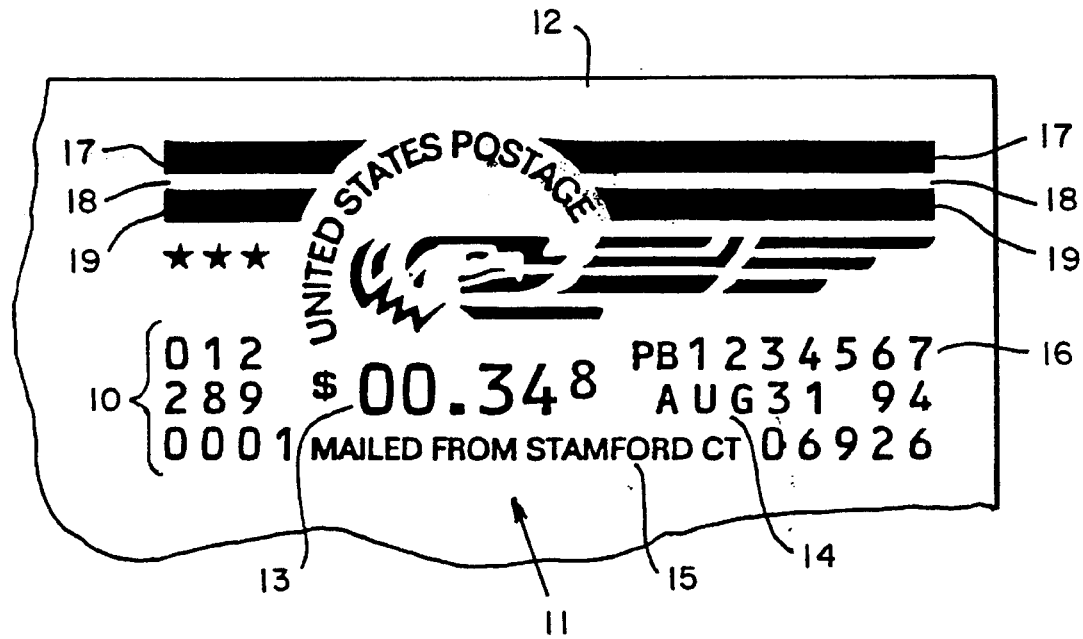
FIG. 3 is a drawing of a postal indicia containing special markings in addition to the information contained in FIG. 2.

FIG. 3 is a drawing of a postal indicia containing special markings, besides the information contained in FIG. 2, which in the example shown are bars. Postal indicia 11 was printed with an ink that is fluorescent with or without phosphorescence. The postal indicia may be printed on mail piece 12 by an ink jet printer. The postal indicia 11 contains a dollar amount 13, the date 14 that the postal indicia was affixed to the mail piece, the place the mail piece was mailed from 15 and the postal meter serial number 16 and a security code 10. In addition the postal indicia 11 will include bars 17, 18 and 19. These are printed by conventional printing methods. It would be obvious to one skilled in the art that the presence or absence of various states of luminescence may be used. It would also be obvious to one skilled in the art that any type of markings having any geometric shape may be used for bars 17, 18 and 19, i.e., stars, circles, triangles, etc.

In the event that a fluorescent ink currently used for printing postal meter indicia is used, then and in that event sorting information may be encoded into bars 17, 18 and 19. For instance, each of bars 17, 18 and 19 may be printed with the fluorescent ink, none of the bars may be printed with the fluorescent ink, or some of the bars may be printed with the fluorescent ink. Each bar can have two possible states. Hence, eight possible combinations may be encoded in bars 17, 18 and 19.

In the event an ink that is fluorescent and phosphorescent at the same time is used, sorting information may be encoded into bars 17, 18 and 19. For instance: each of bars 17, 18 and 19 may be printed with the ink that is fluorescent and phosphorescent; none of the bars 17, 18, and 19 may be printed with the ink that is fluorescent and phosphorescent; or some of the bars 17, 18, and 19 may be printed with the ink that is fluorescent and phosphorescent. Thus, bars 17, 18 and 19, each have four possible states. Hence, 64 possible combinations may be encoded in bars 17, 18, and 19 without using any additional space. It will be obvious to one skilled in the art that additional bars may be utilized to convey additional information.

The inks that are used to print postal indicia 11 may be applied using conventional printing methods i.e., impact printing or bit map generated imprints (digital) i.e., thermal transfer, laser or ink jet, etc. The inks used to print postal indicia 11 by conventional printing methods are current fluorescent inks. The inks that are used to print postal indicia 11 in bit map generated or digital printing would be specific for the selected printing mechanism, and would also be fluorescent.

The type link (Dispersion ink) of this invention is made from vehicles such as Diisooctyl Phthalate (DIOP), Shellflex 4131 with additives eugenol, lecithin, dispersing agents, polyvinylchloride (PVC) and stearate gels. There will be colorants, fluorescent pigments, non fluorescent red dyes and phosphorescent compounds.

The general formula of type I ink of this invention is as follows:

| | Type I ink |
|---|---|
| Vehicle A | Dioctyl Phthalate, or Diisooctyl Phthalate, or Dioctyl Adipate, or Butyl Acetal Recinoleate |
| Vehicle B | Extender and Plasticizer containing severely hydro-treated light naphthenic distillate |
| antioxidant | substituted diphenylamine |
| wetting agent | A mixture of digylcerides or stearic, palmitic and/or oleic acids linked to chlorine ester of Phosphoric acid |
| Dispersant | Aluminum stearate |
| Stabilizing agent | Polyvinyl chloride |
| Deodorant | Eugenol, or Isoeugenol (also used as a secondary antioxidant) [2 Methoxy-4(2-propenyl) phenol] |
| Non Fluorescent colorants | Red lake C, sodium lithol (C.I. #15630 BrilliantToning Red) Permanent Red 2B (C.I. #15865) |
| Fluorescent Flushes | Flushes are custom made for different applications. They contain the following: Fluorescent pigments that are solid solutions of dyes in friable organic resins. A typical example is a powder containing melamine - sulfonamide and/or melamine - formaldehyde resin that contains various dissolved fluorescent dyes such as Rhodamine B (C.I. #45175). This will produce a blue shade that can be blended with another Rhodamine B dye pigment to produce a yellow shade. A proper mixture |

| | Type I ink |
|---|---|
| | of the above is dispersed in a linseed oil based alkyd vehicle to produce the required color. |
| Phosphorescent material | Rare earth metal sulfides Yttrium oxysulfide, Europium doped ($y_2O_2S$:Eu) [id #-YSA or YSB]. Yttrium Phosphovanadate, Europium doped [Y(P,V)$O_4$:Eu][id #YPV-A] |

The procedure for preparing type links is as follows, along with physical properties and print performance.

INK PREPARATION: Type I Example 1
Red Phosphorescent Red Fluorescent Dispersion Ink

| Ingredient | Manufacturer | Weight % (incl. Vehicle) | Weight % (solid) |
|---|---|---|---|
| Strong Red Orange D-516 | Lawter | 38.8 | 19.4 |
| Aluminum Stearate (Gel in PRV*) | Witco Chem. | 4.5 | 0.45 |
| Sodium Lithol Red | Sherwin Williams | 7.0 | 2.43 |
| Diisoctyl Phthalate DIOP | Exxon | 34.7 | 67.25 |
| Yttrium Phosphovanadate (Europium Doped) | United Mineral Chemical Corp. | 10.0 | 10. |
| The other additivies ** | | 5.0 | 5.0 |

*PRV is a porous roller vehicle custom blended.
** antioxidant, dedorant, PVC gel

EQUIPMENT

1—Model L Kady Mill Equipped with two speed drive (12,000 and 16,000RPM) Manufactured by Kinetic Dispersion Corp.

1—Quart Stainless Mixing Vessel with Cover

1—Thermometer

1—Balance

1—Electric Mixer (low shear <1500RPM) and Blade

1—Disposable Weighing Beaker

Safety equipment, i.e., goggles, gloves & protective wear.

PROCEDURE

Weigh out into mixing vessel vehicles A and B liquids then stir with low shear mixer blade at <100 rpm for 5 minutes.

Weigh into mixing vessel the wetting agent, antioxidant, deodorants and non fluorescent colorants. Turn on cooling water at 4 liter/minute, lower Kady Mill mixing head into the vessel and close cover. Start mill at low speed and run for 5 minutes. (Be sure to use necessary safety equipment).

Weigh into disposable beaker the approximate stabilizing agents dispersing gels then Phosphorescent compound and fluorescent flush. Leave cooling water on. Add one third of this material to mixing vessel, close cover and stir at high speed for 1 minute. Repeat this step until all ingredients are in the container. Stir every 2 minutes until ink reaches 70° C.

Allow the ink to cool to ambient conditions and determine the following properties at 25 degrees Celsius.

| | |
|---|---|
| Viscosity | 300+ or −50 cps |
| Specific Gravity | 1.1+ or −0.1 |
| Fineness of Grind (Gardner - Hegmen) | <1.5 mils |
| Peak red fluorescence emission | 620 nm |
| Peak ref phosphoescence emission | 620 nm |

-continued

| | |
|---|---|
| Glass Slide Red Fluor Intensity. | 26 units |
| Glass Slide Red Phosphor Intensity | 36 units |

Last two measured with United States Postal Service Luminescence Detecting Equipment.

| | |
|---|---|
| Indicia Print Resistance to Mechanical Abrasion | 50 cycle Tabor Test. |
| Imprint Stability to common materials | Legible after exposure. |
| Stability, shelf life and storage life/per | United States Postal |

Materials compatibility—compatible for porous foam roller applications, all metal and rubber meter print drum, other print elements and all materials in contact. The ink of this invention passes all occupational and user safety regulations of the United States Government.

The ink of this invention applied to paper with the results discussed below: meets UPS Advanced Facer Canceller luminescent recognition requirements. The prints are also stable to water and light.

Type I Example 2 Red Phosphorescent Red Fluorescent Dispersion Ink

| Ingredient | Manufacturer | Wt % (Incl. Vehicle) | Wt % Solid |
|---|---|---|---|
| Srong Red Orange (D516) | Lawter | 27.0 | 13.5 |
| Permanent Red 2B | Sterling Drug | 5.5 | 1.4 |
| Sodium Lithol | Sherwin Williams | 7.8 | 2.7 |
| Diisooctyl Phthalate | Exxon | 33.0 | 33.0 |
| Shellflex 4131 | Hexagon Products | 7.2 | 7.2 |
| Aluminum Stearate gel | Witco Chemical | 5.0 | 0.5 |
| PVC gel | | 7.0 | 0.2 |
| Eugenol | Fisher Scientific | 0.5 | 0.5 |
| WingStay 29 | R. T. Vanderbilt | 1.0 | 1.0 |
| Lecithin (Sta-Sol) | Staley | 1.0 | 1.0 |
| YPV-A | United Mineral and Chemical Corp. | 5.0 | 5.0 |

The properties of this ink are consistent for the intended application.

For certain printing applications currently in use, the type I link is not applicable. In those instances a solution ink of this invention referred to herein as a type II ink is used. The solution ink contains the following: solvents such as tetraethylene glycol, tripropylene glycol, triethylene glycol, diethylene glycol Polyoxyethylene fatty ester (G2109), oleyl alcohol ethoxylate (Ameroxol OE-5). Non ionic surfactants with a HLB between 4 and 10 like: Pluracol or Igepal, [alkyl phenoxy poly (ethylenoxy) ethanol]. The fluorescent toners or pigments are various Rhodamine dyes dissolved in melamine polymer of benzene sulfonamide, aromatic methyl formaldehyde and tetrahydro imidazo [4,5-d]imidazole-2,5 (1H,3H) dione with a molecular weight average of 1000 to 15,000. Certain non fluorescent dyes to adjust color without destroying the luminescence. The rare earth metal sulfide and vanadium phosphorescent compound, Europium doped. Special additives to keep the ink stable.

The general formula for the type II ink of this invention is as follows:

| | |
|---|---|
| Solvent A | tripropylene glycol (TPG) and/or tetraethylene glycol (TEEG) or triethylene glycol (TEG) and/or diethylene glycol, (DEG) |
| Solvent B | Polyoxyethlene fatty ester (G-2109) or Polyhydroxy esters, e.g. dodecyl alcohol ethoxylate (TDA - 3) or oleyl alcohol ethoxylate (Ameroxol) |
| Thinning Agent | Propylene carbonate (PC) |
| Surfactant | Igepal CO 530 and/or Igepal CO610 or Pluracol |
| Fluorescent Toner | Day Glo HMS series The toners are fluorescent dyes dissolved in Amino or Amide-aldehyde resins i.e, for example Tri-azine modified ortho and paratoluene sulfonamide resin, with Basic Red 1(CI 45160), and/or Basonyl Red 482(CI 45160), C.I. Basic Violet #11 and/or, C.I. Solvent 135, Alberta Yellow C.I. Solvent Yellow 44, Yukon Yellow, Elbason Fluorescent Yellow PGPC.I and or C.I. Solvent Yellow 60:1, , etc. |
| Coloring Dyes | Neptune Red 543 and or Orasol Violet RN |
| Phosphorescent Materials | YSA or YSB YPV-A [$Zn_2SiO_4$:Mn]Zinc orthosilicate doped with Manganese [id # Sylvania 2284C or 2283C] |

PREPARATION OF TYPE II INK

Type II Example 1 - Red Fluorescent Phosphorescent Solution Ink

| Ingredient | Manufacturer | Weight % |
|---|---|---|
| Fluroescent Toners GF Series #0010 and #0028 | Radiant | 31.8 |
| Neptune Red 543 and or Orasolviolet - RN | BASF Ciba Geigy | 0.2 |
| PC | Aldrich | 4.0 |
| G2109 | ICI | 26.0 |
| Igepal CO530 | GAF | 5.0 |
| TEEG | DOW | 16.0 |
| TPG | DOW | 16.0 |
| Phosphorescent material YPV-A or Sylvania 2284C | United Minerals & Chemical Corporation or Sylvania | 1.0 |

EQUIPMENT

Model L Kady Mill equipped with high shear mixer and temperature control.

Top loading balance

Thermometer to 100 C

Weighing dishes

Polyethylene storage bottles and jars

Safety equipment (goggles, gloves, apron, etc.)

INK PREPARATION:

Weigh and record weight of empty container.

In the above container weigh in the calculated amount solvent B.

Re-zero the balance with solvent B and weigh correct amount of second solvent B.

Repeat the above steps until all of solvents A have been added.

Weigh out the coloring dyes in a separate container.

Weigh out all the fluorescent toners in a separate container.

Weigh out the phosphorescent material in a separate container.

Transfer the solvents A and B to mixing vessel. Turn on and mix for 1 minute.

With mixer still running, add the non fluorescent dyes and mix until temperature reaches 51° C.

Add the fluorescent toners slowly.

Add the phosphorescent material.

Mix all ingredients until temperature of contents reaches 78° C.

Stop mixing and wait 10 minutes before filtering through 150 micron nylon bag.

| Properties at 25 degrees Celsius. | |
| --- | --- |
| Viscosity | 750+ or −75 cps |
| Surface tension | 37+ or −3 dynes/cm |
| Fluorescent peak 620 nm | |
| Phosphorescent peak 620 nm | |
| Glass Slide Red Fluor. Intensity | 26 units |
| Glass Slide Red Phosphor Intensity | 36 units |

Last two measured with United States Postal Service Luminescence Detecting Equipment.

Indicia Print Resistance to Mechanical Abrasion 50 cycle Tabor Test.

Imprint Stability to common materials Legible after exposure.

Materials compatibility—compatible for porous foam pad applications, rubber print plate: Stability, shelf life and storage life per United States Postal Service requirements. The ink passes all safety tests for consumer use.

The ink of this invention applied to paper meets USPS Advance Facer Canceller luminescent recognition requirements. The prints are also stable to water and light.

| Type II Example 2 Red Fluorescent Phosphorescent Solution Ink | | |
| --- | --- | --- |
| Ingredient | Manufacturer | Weight % |
| Fluorescent toners HMS 30, HMS 34 | Day Glo | 30.8 |
| Neptune Red 543 | BASF | 0.2 |
| P.C. | Aldrich | 3.0 |
| Ameroxol OE5 | Americhem | 17.5 |
| TDA-3 | BASF | 25.0 |
| TPG | Aldrich | 15.0 |
| Pluracol P 425 | BASF | 3.5 |
| Phosphorescent Materials YSA or YSB | United Minerals & Chemical Corp. | 5.0 |

The above properties of this ink are consistent for the intended application.

Figure 4:
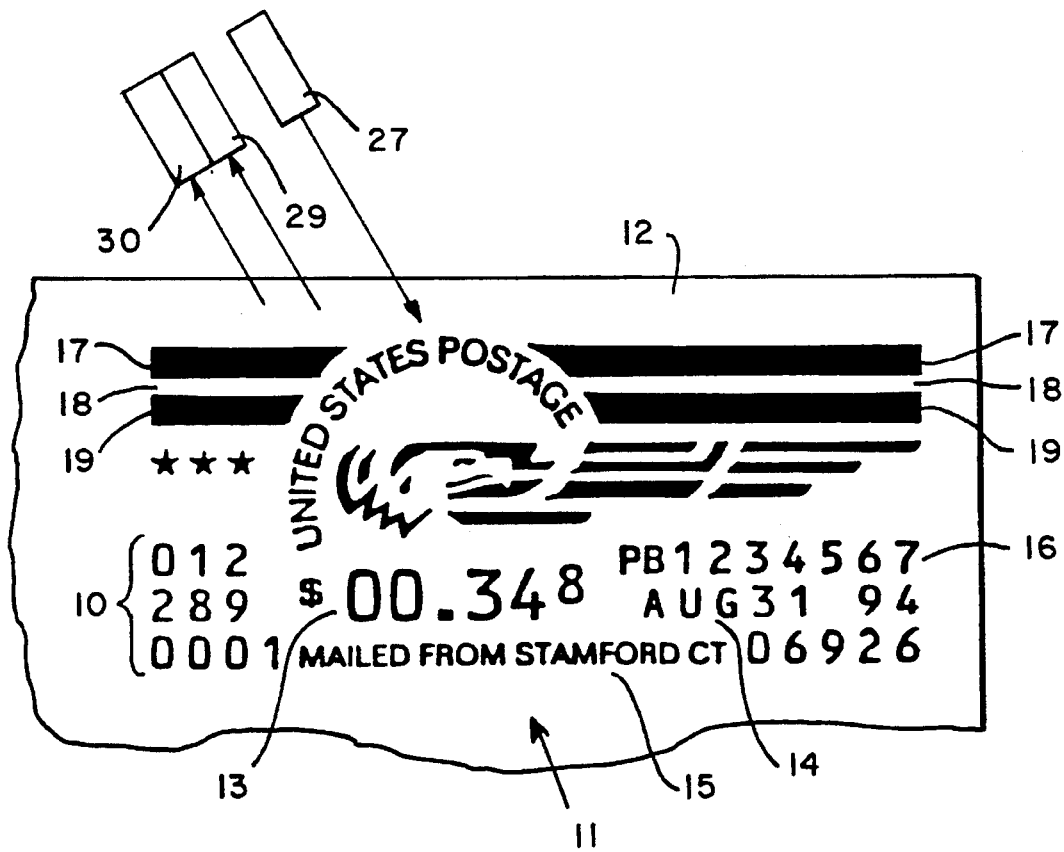
FIG. 4 is a schematic drawing of the detector portion of a facer canceller that is used to detect the markings on the postal indicia shown in FIGS. 1, 2 and 3.

FIG. 4 is a drawing of the detector portion of a facer canceller (not shown) that is used to detect the markings on the postal indicia shown in FIG. 3.

Light source 27 emits light having a wavelength of 254 nm which illuminates indicia 11. Those portions of indicia 11 that will emit red fluorescence, phosphorescence when radiated with light from source 27 will be detected by detector 29 and 30. Similarly detectors 29 and 30 will detect the light emitted by the portions of bars 17, 18 and 19 that exhibited red fluorescence and red phosphorescence i.e. light having wavelengths centered around 620 nm.

Those portions of indicia II and bars 17, 18 and 19 that will exhibit green phosphorescence when radiated with light from source 27 will also be detected by detector 30. Detector 30 detects the light emitted by the portions of indicia 11 of bars 17, 18 and 19 that exhibited green phosphorescence i.e. light having wavelengths centered around 540 nm. Both green and red phosphorescence are detected with the UV light source 29 and 30, momentarily turned off.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A fluorescent, phosphorescent composition dispersion ink that is both fluorescent and phosphorescent when radiated with ultra violet light having a wavelength of 254 nm, said ink composition consisting essentially of:

13.5 to 19.4 weight % of fluorescent pigment;

5 to 10 weight % phosphorescent material;

0 to 1.0 weight % wetting agent;

0.45 to 0.5 weight % aluminum stearate;

0 to 0.2 weight % polyvinyl chloride;

0 to 0.5 weight % deodorant;

0 to 1.0 weight % substituted diphenylamine 2.4 to 4.1 weight % non fluorescent pigments; and the balance consisting of dioctyl phthalate, or diisooctyl phthalate or dioctyl adipate, or butyl acetal ricinoleate and/or extender and plasticizer containing severely hydro-treated vehicles or mixtures thereof.

2. The composition claimed in claim 1, wherein the fluorescent pigments are solid solutions of fluorescent dyes dissolved in melamine-sulfonamide.

3. The composition claimed in claim 2, wherein the fluorescent dyes are rhodamine dyes.

4. The composition claimed in claim 1, wherein the fluorescent pigments are solid solutions of fluorescent dyes dissolved in melamine-formaldehyde.

5. The composition claimed in claim 4, wherein the fluorescent dyes are rhodamine dyes.

6. The composition claimed in claim 1, wherein the fluorescent pigments are solid solutions of fluorescent dyes dissolved in melamine-sulfonamide and melamine-formaldehyde.

7. The composition claimed in claim 6, wherein the fluorescent dyes are rhodamine dyes.

8. The composition claimed in claim 1, wherein the phosphorescent material consists essentially of: rare earth metal sulfide and yttrium oxysulfide, or yttrium phosphovanadate compounds doped with europium.

9. A solution fluorescent, phosphorescent composition ink that is both fluorescent and phosphorescent when radiated with ultra violet light having a wavelength of 254 nm, said ink composition consisting essentially of:

30.8 to 31.8 weight % of fluorescent toner;

1 to 5 weight % phosphorescent material;

15 to 32 weight % tripopylene glycol (TPG) and/or tetraethylene glycol (TEEG) or triethylene glycol (TEG) and/or diethylene glycol, (DEG);

26 to 42.5 weight % polyoxyethylene fatty ester or dodcyl alcohol ethoxylate or oleyl alcohol ethoxylate;

3 to 4 weight % propylene carbonate;

3.5 to 5 weight % surfactant; and 0.2 weight % coloring dyes.

10. The composition claimed in claim 9, wherein the fluorescent toners consist essentially of:

solution of fluorescent dyes dissolved in melamine polymer of benzene sulfonamide, methyl formaldehyde and tetra hydro imidazo (4,5-d) imidazole-2.5 (1H, 3H) dione with a molecular weight average of 1,000 to 15,000 yielding a solid.

11. The composition claimed in claim 9, wherein the fluorescent toners consist essentially of:

solid solution of fluorescent dyes dissolved in tri-azine modified sulfonamide resin.

12. The composition claimed in claim 9, wherein the fluorescent toners consist essentially of:

fluorescent dyes dissolved in matrix resin made of amino or amide aldehyde with ortho and para toluene sulfonamide.

13. The composition claimed in claim 12, wherein the fluorescent dye consist essentially of:

Basic Red 1, C.I. Basic Violet 11, and C.I. solvent yellow 44.

14. The composition claimed in claim 10, wherein the fluorescent dye consist essentially of:

Basic Red 1, C.I. Basic Violet 11, C.I. solvent 135, and C.I. solvent yellow 60:1.

15. The composition claimed in claim 11, wherein the fluorescent dye consist essentially of:

Basic Red 1, C.I. Basic Violet 11, C.I. solvent 135, and C.I. solvent yellow 60:1.

16. The composition claimed in claim 9, wherein the phosphorescent material consists essentially of:

rare earth metal sulfide and yttrium oxysulfide, or yttrium phosphoranadate compounds doped with europium.

17. The composition claimed in claim 9, wherein the phosphorescent material consists essentially of:

zinc orthosilicate doped with maganese.

18. The composition claimed in claim 17, wherein the esters consists essentially of:

oleyl alcohol ethoxylate, and dodecyl alcohol ethoxylate.

19. The composition claimed in claim 9, further including a thinning agent:

propylene carbonate.

20. The composition claimed in claim 9, wherein the surfacant is non ionic with a hydrophile-lipophile balance (HLB) between 4 and 10.

* * * * *